(12) United States Patent
Whitney et al.

(10) Patent No.: US 8,150,015 B1
(45) Date of Patent: Apr. 3, 2012

(54) SYSTEM AND METHOD OF PHONE BRIDGING

(75) Inventors: Jason K. Whitney, Lee's Summit, MO (US); Jason R. Delker, Olathe, KS (US); John M. Everson, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 953 days.

(21) Appl. No.: 12/136,209

(22) Filed: Jun. 10, 2008

(51) Int. Cl.
*H04M 3/42* (2006.01)
*H04W 4/14* (2009.01)
(52) U.S. Cl. ............... 379/202.01; 379/201.12; 455/416
(58) Field of Classification Search ............. 379/202.01, 379/201.01; 455/416
See application file for complete search history.

(56) References Cited

U.S. PATENT DOCUMENTS

| | | | |
|---|---|---|---|
| 5,987,318 A * | 11/1999 | Alperovich et al. | 455/416 |
| 6,757,358 B1 * | 6/2004 | Kondziela | 379/38 |
| 6,839,417 B2 | 1/2005 | Weisman et al. | |
| 7,418,090 B2 * | 8/2008 | Reding et al. | 379/202.01 |
| 7,436,785 B1 | 10/2008 | McMullen et al. | |
| 7,593,520 B1 * | 9/2009 | Croak et al. | 379/202.01 |
| 2003/0026407 A1 * | 2/2003 | Ernstrom et al. | 379/207.02 |
| 2006/0104306 A1 * | 5/2006 | Adamczyk et al. | 370/466 |

OTHER PUBLICATIONS

Zhang, Alex, et al., Patent Application entitled "System and Method for Initiating Multiple Party Calls Using a Virtual User Agent," filed Jun. 24, 2003, U.S. Appl. No. 10/602,378.

\* cited by examiner

*Primary Examiner* — Rasha Al Aubaidi

(57) ABSTRACT

A method for providing a dynamic bridge service is provided. The method comprises provisioning a dynamic bridge service associated with at least a first private number and a second private number. The method also comprises receiving an origination attempt from an electronic device associated with a third private number to establish a call to an electronic device associated with the first private number, requesting the bridge to be opened in response to receiving the origination attempt, and connecting the electronic device associated with the third private number to the bridge. The method also comprises connecting the electronic device associated with the first private number to the bridge, receiving a request to join the bridge from an electronic device associated with the second private number, and connecting the electronic device associated with the second private number to the bridge in response to receiving the request to join the bridge from the electronic device associated with the second private number.

20 Claims, 7 Drawing Sheets

SYSTEM AND METHOD OF PHONE BRIDGING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Conference bridging traditionally requires a party seeking to initiate a conference bridge session to pre-arrange the session with a third party service provider, often for a fixed call duration and with a set group of participants. It requires participants to dial into a dedicated telephone number at a prearranged time and provide an access code. A call operator may be involved who may announce participants and monitor the bridge discussion. Parties initiating a conference bridge call generally incur a cost and participants phoning into the bridge may incur toll charges. Participants seeking to join must have at least the dial-in number, the access code and perhaps be on the pre-set list of participants to join a traditional conference bridge and may otherwise be denied admission.

SUMMARY

In an embodiment, a method for providing a dynamic bridge service is provided. The method comprises provisioning a dynamic bridge service associated with at least a first private number and a second private number. The method also comprises receiving an origination attempt from an electronic device associated with a third private number to establish a call to an electronic device associated with the first private number, requesting the bridge to be opened in response to receiving the origination attempt, and connecting the electronic device associated with the third private number to the bridge. The method also comprises connecting the electronic device associated with the first private number to the bridge, receiving a request to join the bridge from an electronic device associated with the second private number, and connecting the electronic device associated with the second private number to the bridge in response to receiving the request to join the bridge from the electronic device associated with the second private number.

In another embodiment, a system for a telecommunications bridge system is provided. The system comprises a gateway controller programmed to determine when a call origination attempt is associated with a first private number, wherein the first private number is provisioned with a dynamic bridge service, to determine when a bridge associated with the first private number is open. The gateway controller is also programmed to open the bridge associated with the first private number in response to determining that the bridge is closed, to cause the electronic device associated with the first private number to be connected to the bridge, to cause an electronic device associated with a second private number to be connected to the bridge, wherein the second private number is also associated with the call origination attempt. The gateway controller is also programmed to determine when a request from an electronic device associated with a third private number is provisioned with the dynamic bridge service provisioned for the first private number and to connect the electronic device associated with the third private number in response to determining that the third private number is provisioned with the dynamic bridge service provisioned for the first private number.

In another embodiment, a method for providing a dynamic bridge service is provided. The method comprises provisioning a dynamic bridge service associated with at least a first private number and a second private number and receiving an origination attempt from an electronic device associated with the first private number to establish a call to an electronic device associated with a third private number. The method also comprises requesting the bridge to be opened in response to receiving the origination attempt, connecting the electronic device associated with the first private number to the bridge, and connecting the electronic device associated with the third private number to the bridge. The method also comprises receiving a request to join the bridge from an electronic device associated with the second private number and connecting the electronic device associated with the second private number to the bridge in response to receiving the request to join the bridge from the electronic device associated with the second private number.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
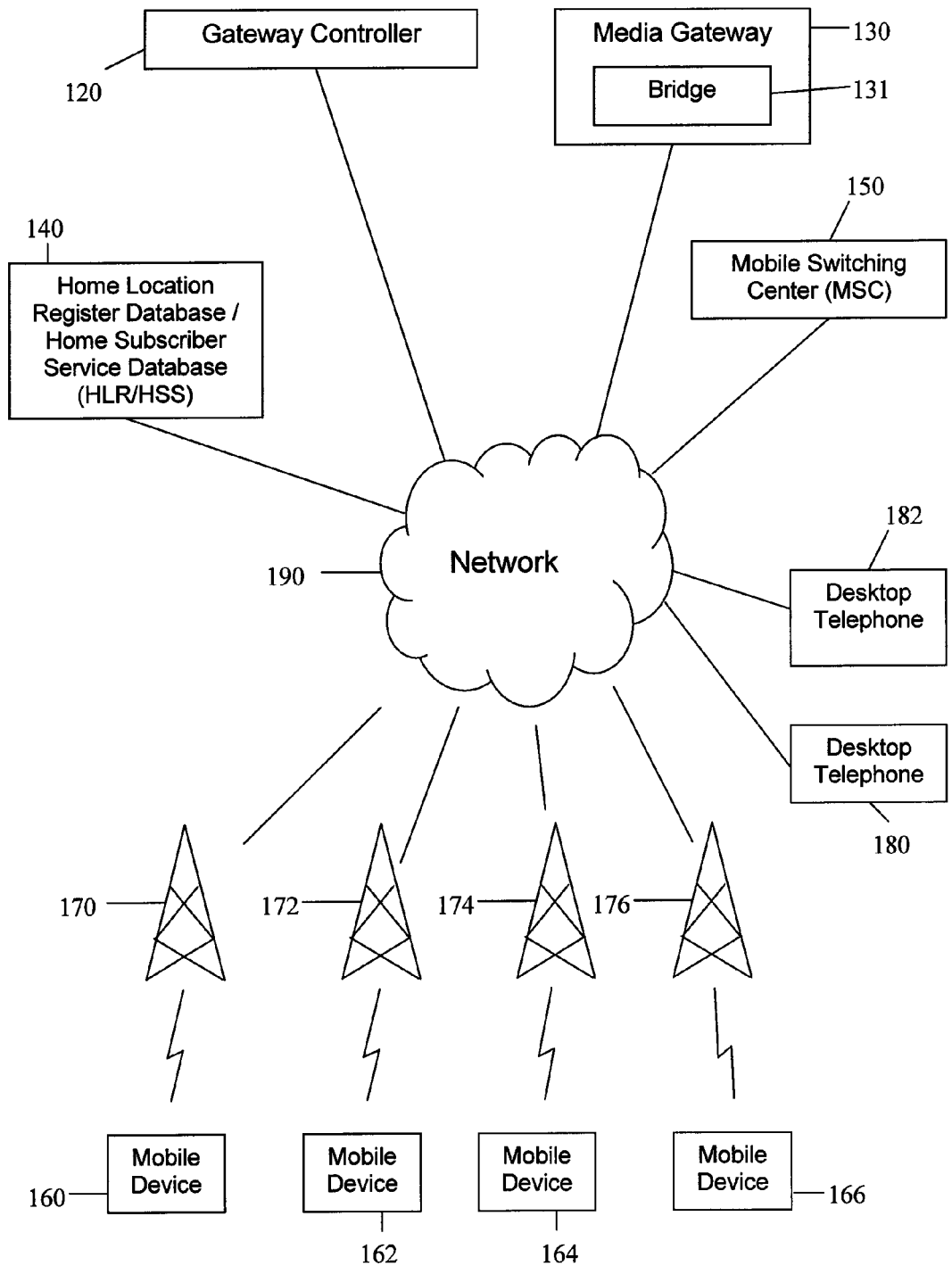
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Commercially available conference bridging generally makes economic and practical sense only for business or institutional applications involving a plurality of participants with a preset agenda. The structural limitations of traditional conference bridging do not allow for social, casual, or spontaneous applications and do not readily permit the dynamism arising from impromptu gatherings that makes group interaction rewarding. Several embodiments of a system and method for phone bridging are taught which promote parties to conduct conference bridge calling without the need to contract with a commercial provider of telecommunications services, enter a dedicated telephone number to access the conference bridge or provide an access code to be admitted. The system comprises a gateway controller which manages call sessions and connection states between devices on a network and provides signaling to open, operate, and close the bridge service on a media gateway. In embodiments of the system and method, a private telephone number is provisioned with a dynamic bridge service which is enabled and managed by the gateway controller. The dynamic bridge service is associated with the private telephone number and is activated when the private telephone number conducts a call with another party. Should a third party authorized by the holder of the first private number wish to join in the ongoing call between the private number and the other party, the third party may enter a shortcut code on its own telephone keypad and be announced and admitted into the call with few or no additional steps. A fourth party and additional parties who have been authorized by the holder of the private number may join the call in the same manner. Once the private number has been provisioned for the dynamic bridge service and the holder of the private number authorizes certain parties to join the private number's bridge when it is activated or open, the authorized parties may join the private number in its calls with other parties, whether those other parties are themselves provisioned with the dynamic bridge service or have been designated by the first private number as authorized to join in calls in which the first private number may be engaged.

A family or a small social group may wish to speak collectively on a spontaneous basis with minimal steps to initiate and conduct a group call. When a first participant is provisioned with dynamic bridge service and the first participant authorizes other participants, for example members of the first participant's family or social group, to be members of the first participant's call bridge, the act of the first participant conducting a call with any party, whether that party is or is not a member of the authorized bridge group, opens the bridge service. Thenceforth, any members of the authorized bridge group may join in calls that the first participant is engaged in with any party. Embodiments of the dynamic bridge service may provide for the first participant to enable joining by authorized bridge group members only when the first participant is on a call with specific other parties. For example, a call between the first participant and a business associate could not be ordinarily joined by the first participant's family member during business hours. As another example, a family group call involving the first participant's dynamic bridge service could not be ordinarily joined by a business associate of the first participant during the evening. The dynamic bridge service is provisioned for a specific telephone number and the telephone number to which the dynamic bridge service is assigned determines the members of the party's group of authorized bridge group participants and other parameters such as hours when certain participants may join and permissions regarding announcements required when joining or exiting an ongoing bridge call. Embodiments of the dynamic bridge service provide for a participant to join and monitor an ongoing call bridge silently, such as a parent monitoring a child's telephone usage.

Turning to FIG. 1, a system 100 for providing a dynamic bridge service is provided. The system 100 comprises a gateway controller 120, a media gateway 130, a home location register database/home subscriber service database 140, a mobile switching center 150, a mobile device 160, a first wireless base station 170, a desktop telephone 180, and a network 190. In an embodiment, the system 100 may comprise additional mobile devices including a second mobile device 162, a third mobile device 164, and a fourth mobile device 166, additional wireless base stations including a second wireless base station 172, a third wireless base station 174, and a fourth wireless base station 176, and an additional desktop telephone 182.

The gateway controller 120 provides call control and signaling functionality and handles the registration and management of resources at a media gateway. The gateway controller 120 controls the parts of a call state that pertain to connection control for media channels in a media gateway. The gateway controller 120 conducts session management and may exchange messages with central office switches (not shown) via a signaling gateway. The gateway controller 120 sends signaling information to the media gateway 130 and can instruct the media gateway 130 to alert a called party, to send and receive voice and data, and perform other tasks.

The media gateway 130 carries out instructions provided primarily by the gateway controller 120. The media gateway 130 converts data from the format required for one type of network to the format required for another type of network. The media gateway 130 hosts the bridge 131 that comprises the dynamic bridge service functionality directed by the gateway controller 120.

The home location register database/home subscriber service database 140 (HLR/HSS) is a central database that contains details of mobile phone subscribers. The home location register database/home subscriber service database 140 may store details of subscriber identity module (SIM) cards issued by a mobile phone operator.

The mobile switching center 150 (MSC) is a telephone exchange which provides circuit-switched calling, mobility management, and other services to the mobile phones roaming within the area that the mobile switching center 150 serves.

The first, second, third, and fourth mobile devices 160, 162, 164, 166 are portable electronic devices and may be any of a mobile phone, a personal digital assistant, and a portable computer.

The first, second, third, and fourth wireless base stations 170, 172, 174, 176 may be any of a cellular wireless base station, for example a Code Division Multiple Access (CDMA), Global System for Mobile Communications (GSM), and/or Universal Mobile Communications System (UMTS) cellular wireless base station; a World-wide Interoperable Microwave Access (WiMAX) base station; a WiFi access point; or other wireless access device. The first, second, third, and fourth wireless base stations 170, 172, 174, 176 are in communication with the network 190, for example via wired communication links.

The desktop telephones 180, 182 may be any of a traditional telephone handset connected by fixed wire to a central office switch (not shown). This technology may be referred to as plain old telephone service (POTS).

The network 190 provides communication between the first, second, third, and fourth mobile devices 160, 162, 164, 166 and the desktop telephones 180, 182. The network 190 may be any communication network including a public data network (PDN), a public switched telephone network (PSTN), a private network, and/or a combination thereof. The network 190 may provide a variety of communication services or forms of communication including email communication, simple message service (SMS) message communication, text message communication, voice traffic communication, web content communication, and other communication services and communication content. While some definitions of the network 190 may include the home location register database/home subscriber service database 140, the gateway controller 120, the media gateway 130, and the mobile switching center 150 as integral components of the network 190, those components have been described separately to better explain and illustrate their roles in this novel conference bridge functionality.

Figure 2:
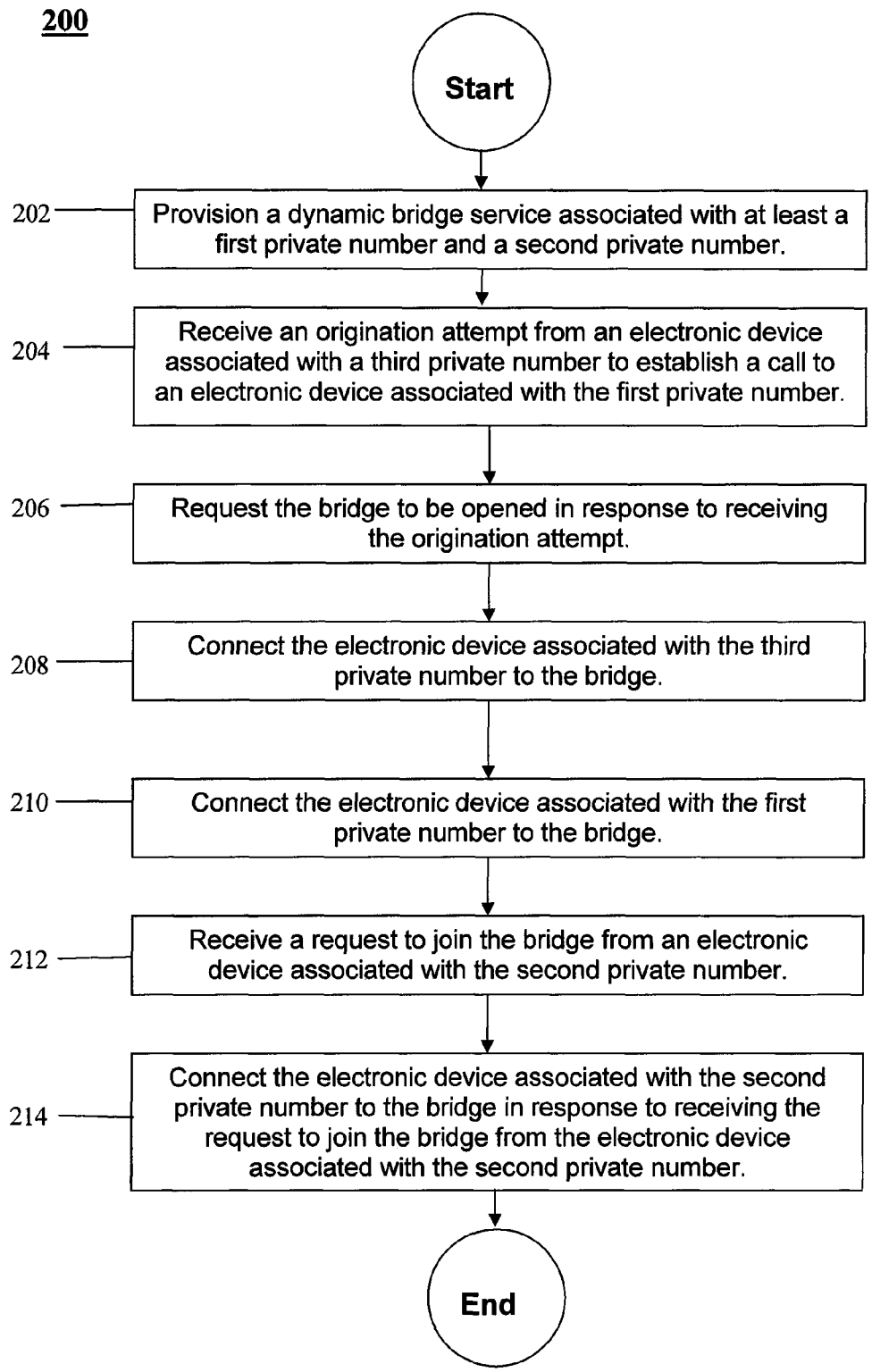
FIG. 2 is a flow chart illustrating a method according to an embodiment of the disclosure.

Turning to FIG. 2, a method 200 for providing a dynamic bridge service is provided. Beginning at block 202, the method 200 comprises the provisioning of a dynamic bridge service associated with at least a first private number and a second private number. In the method 200, the first private number has the primary association with the dynamic bridge service such that the first private number must either initiate or receive a telephone call for the dynamic bridge service to be opened. In embodiments, the dynamic bridge service is associated with the account of the first private number and is not accessible without the first private number being a party to a phone call, whether as the initiating or receiving party. In the method 200, the second private number has been designated by the first private number as an authorized bridge group participant such that the second private number may join calls in which the first private number is a participant with any third party, whether the first private number initiated or received the call and whether or not the third party has also been designated as an authorized bridge group participant by the first private number.

The action of the first private number participating in a telephone call opens or activates the dynamic bridge service. At block 202, the dynamic bridge service is provisioned for the first private number as account holder and the second private number is designated by the first private number as one of an authorized bridge group participant(s). Provisioning the first private number with the dynamic bridge service means the first private number is associated with or has been enabled with dynamic bridge service within the functionality of the gateway controller 120. Provisioning in communications networks generally refers to adding or modifying data in data bases or data tables to configure the behavior of communications nodes and/or the network. Provisioning a private number for dynamic bridge service may entail the addition of data to a database or the manipulation of data already in a database, for example the home location register database/home subscriber service database 140, that has the effect of configuring the behavior of the network to promote the dynamic bridge service. In embodiments of the method 200, the first private number, the second private number, and the third private number may be any of the first, second, third, and fourth mobile devices 160, 162, 164, 166 and the desktop telephones 180, 182 described in the system 100. The first private number, the second private number, and the third private number are associated with electronic devices not owned by telecommunications service providers.

At block 204, a third private number initiates a call to the first private number. In an embodiment, the third private number is not provisioned with the dynamic bridge service and its action of initiating a call to the first private number is unilateral and entirely unrelated to the association of the first private number with the dynamic bridge service. The act of the third private number initiating contact with the first private number is also entirely unrelated to the first private number having designated the second private number as an authorized bridge group participant of the first private number. In the embodiment, the third private number may have no knowledge whatsoever of the second private number in any regard.

At block 206, the dynamic bridge service provisioned for and associated with the first private number is opened by the action of the third private number originating a call to the first private number. The dynamic bridge service is opened for the first private number on a media gateway 130 in response to requests from the gateway controller 120. The opening of the dynamic bridge service associated with the first private number is caused by the action of the third private number initiating an outgoing call to the first private number.

At block 208, the electronic device associated with the third private number is connected to the bridge which was opened at block 206. Although at this stage of the method 200 a party external to the method 200 observing the actions of the third private number might observe what appears to be an ordinary outgoing telephone call placed by the third private number, what has actually occurred is that the third private number's dialing of the telephone number associated with first private number caused the dynamic bridge service associated with the first private number to be opened and the third private number to be connected to the bridge associated with the first private number. This action may occur before the first private number has answered the call.

At block 210, the electronic device associated with the first private number is connected to the bridge. This action is caused by the first private number answering the call originated by the third private number. At this point the first private number and the third private number are both connected to the bridge associated with the first private number and the first private number and the third private number are conducting what to appearances is an ordinary two-way telephone call. In another embodiment of the method 200, the electronic device associated with the first private number may be connected to the bridge before the electronic device associated with the third private number is connected to the bridge. The presence of and participation by the bridge is not apparent to the third private number and the opening of the bridge and connection to the bridge by the third private number and the first private number has taken place without action by the first private number. The opening of the bridge and connection to the bridge by both parties is automatic and occurs because of the association of the first private number to the dynamic bridge service. The establishment of the bridge is enabled by the provisioning of the dynamic bridge service which may remain in effect for many months or many years. The bridge may be opened and closed automatically, requiring no other setup or reservation activity other than the initial one-time request by the subscriber for the service and the associated automated provisioning, many times—perhaps thousands of times—over the duration of the subscribed service feature.

At block 212, a request is received to join the bridge from an electronic device associated with the second private number. When dialing the telephone number associated with the first private number or entering a keypad shortcut associated with the first private number, the second private number may not know ahead of time if the first private number is already on an existing phone call with a third party. In this circumstance, a number of distinguishable scenarios may be supported by the method 200. In a first scenario, the individual associated with the second private number may know that the first private number is already engaged in a call and want to join the call that the first private number is presently engaged in, for example, to support a colleague talking to a client or a vendor. In a second scenario, the individual associated with the second private number may know that the first private number is already engaged in a call and want to be joined silently into that call for monitoring purposes, for example a parent monitoring a child's phone call. In a third scenario, the individual associated with the second private number may not know that the first private number is or is not engaged in a call and may wish to speak only with the first private number, for example a wife calling her husband at work, and not wish to disturb any ongoing call that the first private number may be engaged in with a third party. In a fourth scenario, the second private number only wants to know if the first private number is presently engaged in a telephone call. The system 100 contains functionality allowing the second private number to enter keypad shortcuts specifying its choice in each of the scenarios described above. For example, in the method 200, the second private number after entering the telephone number for the first private number may make the keypad entry of *01 to be actively joined to an existing call, *02 to be silently joined (if authorized), *03 to ring the first private number only if the first private number is not presently on a call, and *04 to be advised that the first private number is not presently on a call and not ring the first private number. With keypad entry *04, the second private number is not joined to the bridge. The keypad entries allow the second private number to choose its course of action depending on what the first private number is doing at the time the second private number initiates its action.

At block 214, the electronic device associated with the second private number may be connected to the bridge pursuant to choices made by the second private number when initiating its call. In the method 200, the connection of the second private number to the bridge causes the second private number to join the telephone call ongoing between the first private number and the third private number and the method 200 ends.

In an embodiment of the method 200, the second private number may initiate its call to the first private number by entering one of the codes described above on the electronic device associated with the second private number. Depending on the code entered, this may connect the second private number to the bridge and the first private number whether the first private number is presently on a call with another party or not. In an embodiment, the dynamic bridge service provisioned for the first private number may allow the first private number to selectively prevent the second private number from joining its calls at certain times or when the first private number is speaking with specific parties.

In the instance of a small group, for example a family, wherein members wish to communicate openly and regularly using the dynamic bridge service, each member may be provisioned both as a bridge and as an authorized bridge group participant. Each member opens the bridge by making or receiving a call to or from another member of the group. Any third member may join the call by phoning either of the two parties that originated the call and additional members may join by phoning any current participants to the call. Provisioning each member both as a bridge and as an authorized bridge group participant allows each member to commence a bridge conference call or join an existing bridge conference call. When a member wishes to speak privately with one or more other members, the mobile devices 160, 162, 164, 166 contain functionality to allow members to temporarily disable their dynamic bridge service functionality such that other authorized bridge group participants are temporarily barred from joining or monitoring their calls. In the instance of a family, permissions may be created such that parents may control this functionality on all phones and children are unable to control this functionality on any phone.

In the method 200, when all of the electronic devices connected to the bridge have disconnected from the bridge, the bridge closes. The dynamic bridge service is provisioned for a private telephone number by a subscriber of the service under an account with a provider of such service. The holder of the account subscribes for the dynamic bridge service for arranged intervals of time, for example about one month at a time, about one year at a time, and about two years at a time. In other embodiments, services may be subscribed for different time periods.

Figure 3:
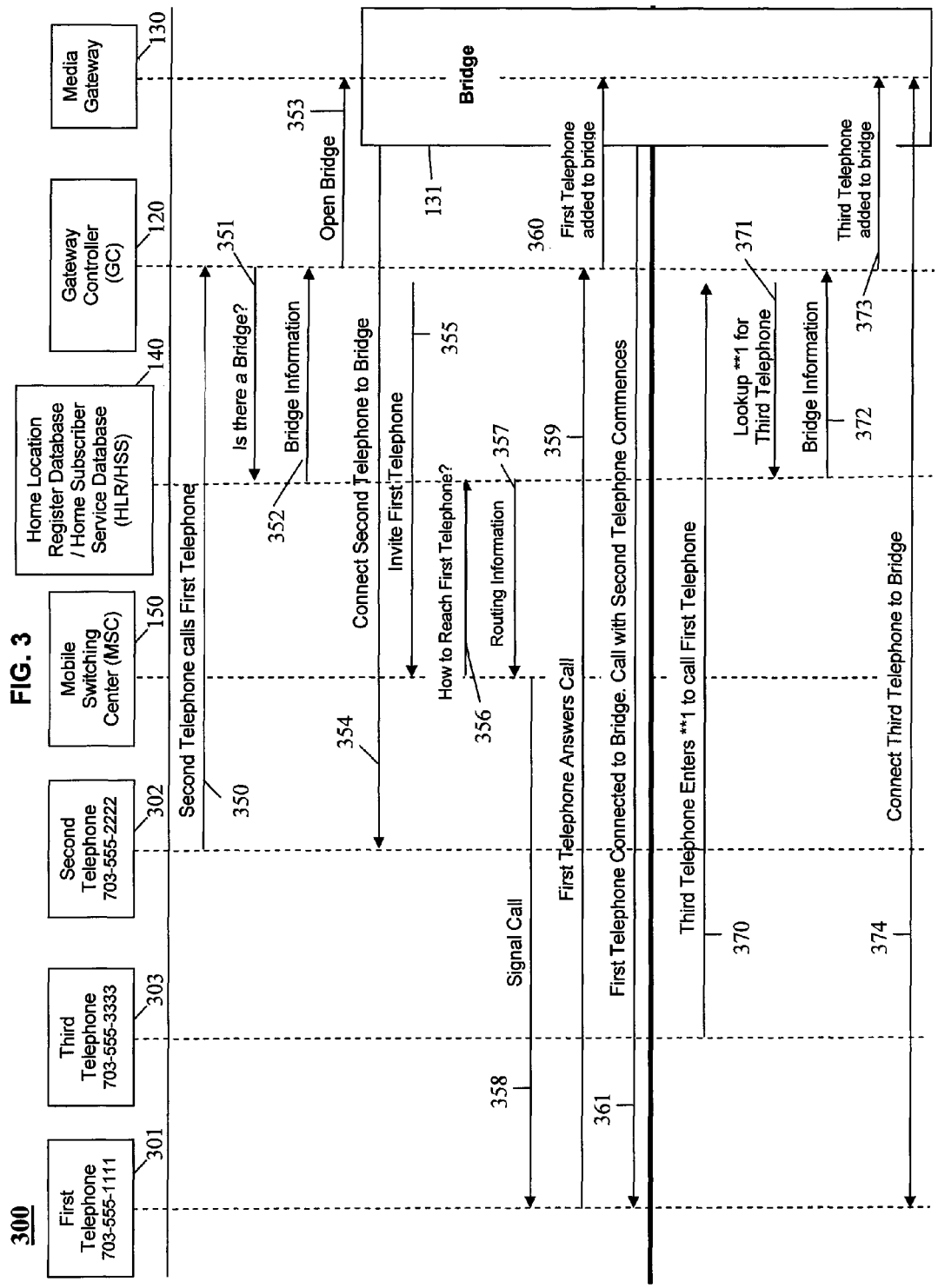
FIG. 3 is a message sequence diagram according to an embodiment of the disclosure.

Turning now to FIG. 3, a message sequence 300 which illustrates an exemplary call flow of the dynamic bridge service, including the signaling operation of the gateway controller 120, is described. The message sequence 300 illustrates signaling activity supporting three devices being joined in an embodiment of the dynamic bridge service. The three devices may be any of the first, second, third, and fourth mobile devices 160, 162, 164, 166 and the desktop telephones 180, 182 illustrated in and described with respect to FIG. 1 above. The three devices comprise a first telephone 301, a second telephone 302, and a third telephone 303. The mobile switching center 150, the home location register database/home subscriber service database 140, the gateway controller 120, and the media gateway 130 were also illustrated in and described with respect to FIG. 1 above.

The message sequence 300 takes place in two stages with the solid bold line in FIG. 3 dividing the two stages. In the first stage, from message 350 through message 361, the second telephone 302 calls the first telephone 301, the bridge 131 is opened, and the call is connected through the bridge 131. In the second stage, from message 370 through message 374, the third telephone 303 calls the first telephone 301 and is bridged to the ongoing call between the first telephone 301 and the second telephone 302 via the bridge 131 using the dynamic bridge service.

Beginning at message 350, the second telephone 302 initiates a call to the first telephone 301 and the outgoing signal from the second telephone 302 is received by the gateway controller 120. At message 351 the gateway controller 120 contacts the home location register database/home subscriber service database 140 and requests if a bridge is in place for either or both of the first telephone 301 and the second telephone 302. The home location register database/home subscriber service database 140 consults its records to determine if the either or both of the first telephone 301 and the second telephone 302 are provisioned with the dynamic bridge service. In the scenario illustrated by the message sequence 300, the first telephone 301 is provisioned with the dynamic bridge service, and the second telephone 302 is not provisioned with the dynamic bridge service. At message 352 the home location register database/home subscriber service database 140 responds back to the gateway controller 120 that the first telephone 301 is provisioned with dynamic bridge service. At message 353 the gateway controller 120 sends signals to the media gateway 130 to open the bridge 131 associated with the first telephone 301. At message 354 the second telephone 302 is connected to the bridge 131.

At message 355 the first telephone 301 is invited. In an embodiment, the first telephone 301 is a mobile telephone and the participation of the mobile switching center 150 is required to locate the first telephone 301 and send call signaling to the first telephone 301. Message 355 comprises the signaling by the gateway controller 120 to the mobile switching center 150 to locate the first telephone 301 and complete the connection sought by the second telephone 302.

At message 356 the mobile switching center 150 contacts the home location register database/home subscriber service database 140 and signals its request for identifying information needed to locate the first telephone 301. As a storehouse of identifying information about mobile devices, the home location register database/home subscriber service database 140 stores routing information specific to mobile devices and at message 357 the home location register database/home subscriber service database 140 sends the requested routing information for the first telephone 301 to the mobile switching center 150.

At message 358 the mobile switching center sends call signaling to the first telephone 301 and the first telephone 301 receives the signal and emits its ring tone or vibration to alert the user of the first telephone 301 of an incoming call. At message 359 the first telephone 301 answers the call by signaling the gateway controller 120. The gateway controller 120 receives the signaling from the first telephone 301, and at message 360 the gateway controller 120 begins signaling to add the first telephone 301 to the bridge 131. At message 361, the first telephone 301 is connected to the bridge 131. With this action, the first telephone 301 and the second telephone 302 are fully connected via the bridge 131, and parties on each telephone may commence speaking.

The second stage of the message sequence 300 begins at message 370 when the third telephone 303 initiates its call to the first telephone 301 by entering input on its keypad. At message 370 the third telephone 303 enters the succession of keystrokes 1 on its keypad to signal to the gateway controller 120 that the third telephone 303 intends to make some type of connection or deliver some other type of instruction across the network. The gateway controller 120 does not store the translated meanings for shortcuts entered by devices on the network. The gateway controller 120 will commence the requested steps to connect the third telephone 303 to the first telephone 301 when the instructions associated with the keystrokes 1 entered by the third telephone 303 are looked up on the home location register database/home subscriber service database 140.

At message 371 the gateway controller 120 signals the home location register database/home subscriber service database 140 with a request to look up the translation of the keystrokes 1 for the third telephone 303. The home location register database/home subscriber service database 140 consults its records for the third telephone 303 and determines that the keystrokes 1 indicate that the third telephone 303 wishes to connect with the first telephone 301. The home location register database/home subscriber service database 140 also examines its records for the first telephone 301 which show that the first telephone 301 is provisioned with the dynamic bridge service. The records also show that the third telephone 303 is listed by the first telephone 301 as an authorized bridge group participant such that the third telephone 303 may join an ongoing telephone call in which the first telephone 301 is engaged. At message 372 the home location register database/home subscriber service database 140 signals back to the gateway controller 120 with the bridge 131 information for the first telephone 301 and provides the further information that the third telephone 303 is an authorized bridge group participant named by the first telephone 301.

At message 373 the gateway controller 120 signals instructions to the media gateway 130 to add the third telephone 303 to the bridge 131 associated with the first telephone 301. At message 374 the media gateway 130 adds the third telephone 303 to the bridge 131. This action inserts the third telephone 303 into the call currently ongoing between the first telephone 301 and the second telephone 302. The call flow may complete by each of the first telephone 301, the second telephone 302, and the third telephone 303 going on hook and the gateway controller 120 sending messages to the media gateway 130 to close the bridge 131.

In the second stage of the message call sequence 300, had the third telephone 303 attempted to call the second telephone 302 instead of the first telephone 301, the third telephone 303 would not have been allowed into the ongoing call between the first telephone 301 and the second telephone 302 because the second telephone 302 had not been provisioned with dynamic bridge service. In an embodiment, the gateway controller 120 is provisioned to connect the third telephone 303 to the bridge 131 without announcing the connection to the first telephone 301 and without requiring any action on the part of the first telephone 301. This would have the effect of permitting the third telephone 303 to silently monitor the conversation between the first telephone 301 and the second telephone 302 without the knowledge of either the first telephone 301 or the second telephone 302. The provisioning of dynamic bridge service for the first telephone 301 and designation of the third telephone 303 as an authorized bridge group participant may be arranged such that the third telephone 303 may silently join the bridge 131 associated with the first telephone 301 without authorization or knowledge of the first telephone 301. In an embodiment, the joining of the third telephone 303 to the bridge 131 may be announced to participants pursuant to requirements mandated by the first telephone 301. In another embodiment, the joining of the third telephone 303 to the bridge may only occur with the permission of the first telephone 301. In embodiments, silent entry and monitoring by parties may only be authorized within given households or families.

In a further embodiment, the first telephone 301 may be one of a group of telephones associated with a single service account with a provider with all telephones associated with the account being provisioned for dynamic bridge service. In this embodiment, any telephone associated with the service account may call any other telephone associated with the service account and be attached to the bridge 131 opened for the telephone being called and join into a call in which the telephone being called is presently engaged. This embodiment may be useful for a family account. In the embodiment presented in the message sequence 300, the third telephone 303 may attach to the bridge 131 opened on behalf of the first telephone 301 but the converse is not true. Since the third telephone 303 is not provisioned for dynamic bridge service and has instead only been listed as an authorized bridge group participant, the first telephone 301 does not have the ability to join calls in which the third telephone 303 is engaged.

Figure 4:
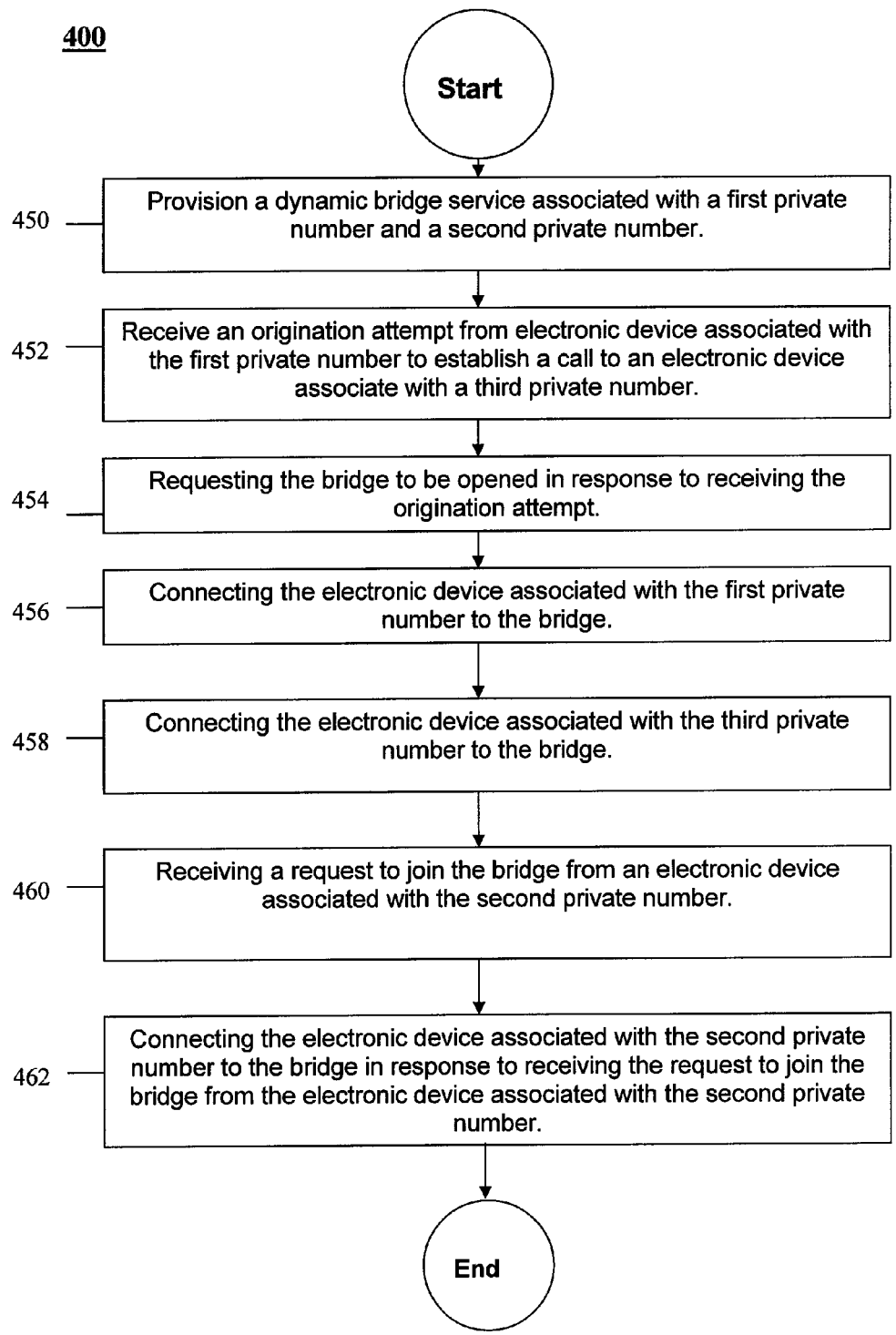
FIG. 4 is another flow chart illustrating a method according to an embodiment of the disclosure.

Turning now to FIG. 4, another method 400 for providing a dynamic bridge service is provided. Starting at block 450, a dynamic bridge service is provisioned that is associated with a first private number and a second private number. In the method 400, the first private number corresponds to a first telephone 301, the second private number corresponds to a second telephone 302, and a third private number corresponds to a third telephone 303.

At block 452, an electronic device associated with the first private number, henceforth the first telephone 301, attempts to establish a call with an electronic device associated with a third private number, henceforth the third telephone 303. As the first telephone 301 is provisioned with the dynamic bridge service, the action of the first private number initiating a telephone call to any party causes the bridge 131 to be opened by the gateway controller 120. At block 454, the bridge 131 associated with the first telephone 301 is opened.

At block 456, the first telephone 301 is connected to the bridge 131. At block 458, the third telephone 303 is connected to the bridge 131. The first telephone 301 and the third telephone 303 commence their telephone call. At block 460, the gateway controller 120 receives a request to join the bridge 131 from the second telephone 302. The second telephone 302, not knowing that the first telephone 301 is currently on a call with the third telephone 303, may prefer to not disturb the first telephone 301 in the event it is on a call. To prevent situations in which the second telephone 302 calls the first telephone 301 that is provisioned with dynamic bridge service and the second telephone 302 is accidentally and against its wishes joined into a bridge call with multiple parties, the second telephone 302 may have the variety of keystrokes described previously in the method 200 available to it before connecting to avoid this risk. In an embodiment, the first telephone 301 may also contain functionality enabling it to block the second telephone 302 from joining its calls with certain third parties. Alternatively, the second telephone 302 may know that the first telephone 301 is on a call with the third telephone 303 or some other party and the second telephone 302 may wish to join into call and participate in the call or instead silently monitor the call without the first telephone 301 and the third telephone 303 being aware that the second telephone 302 is listening to the call. In an embodiment, this type of silent monitoring arrangement may be available. The second telephone 302 may belong to a parent and the first telephone 301 and/or the third telephone 303 may belong to a child and the parent may wish to silently monitor a telephone conversation between the first telephone 301 and the third telephone 303 or other party.

At block 462, the gateway controller 120 connects the second telephone 302 to the bridge 131. This action joins the second telephone 302 to the ongoing telephone conversation between the first telephone 301 and the third telephone 303 either as a full participant or as a silent monitor. In an embodiment, the second telephone 302 may call the first telephone 301 or join telephone calls engaged in by the first telephone 301 by making a bridge bookmark selection on the second telephone 302. Embodiments of the system 100 permit parties provisioned with the dynamic bridge service and authorized bridge group participants to join ongoing bridge sessions expeditiously by programming such keypad shortcuts into their mobile device 160, 162, 164, 166 or desktop telephone 180, 182. When electronic devices disconnect from the bridge 131, the bridge 131 is closed. In the method 400, a private number is provisioned with dynamic bridge service only once in arranging its account with a provider. The opening and closing of the bridge 131 may take place multiple times.

Figure 5:
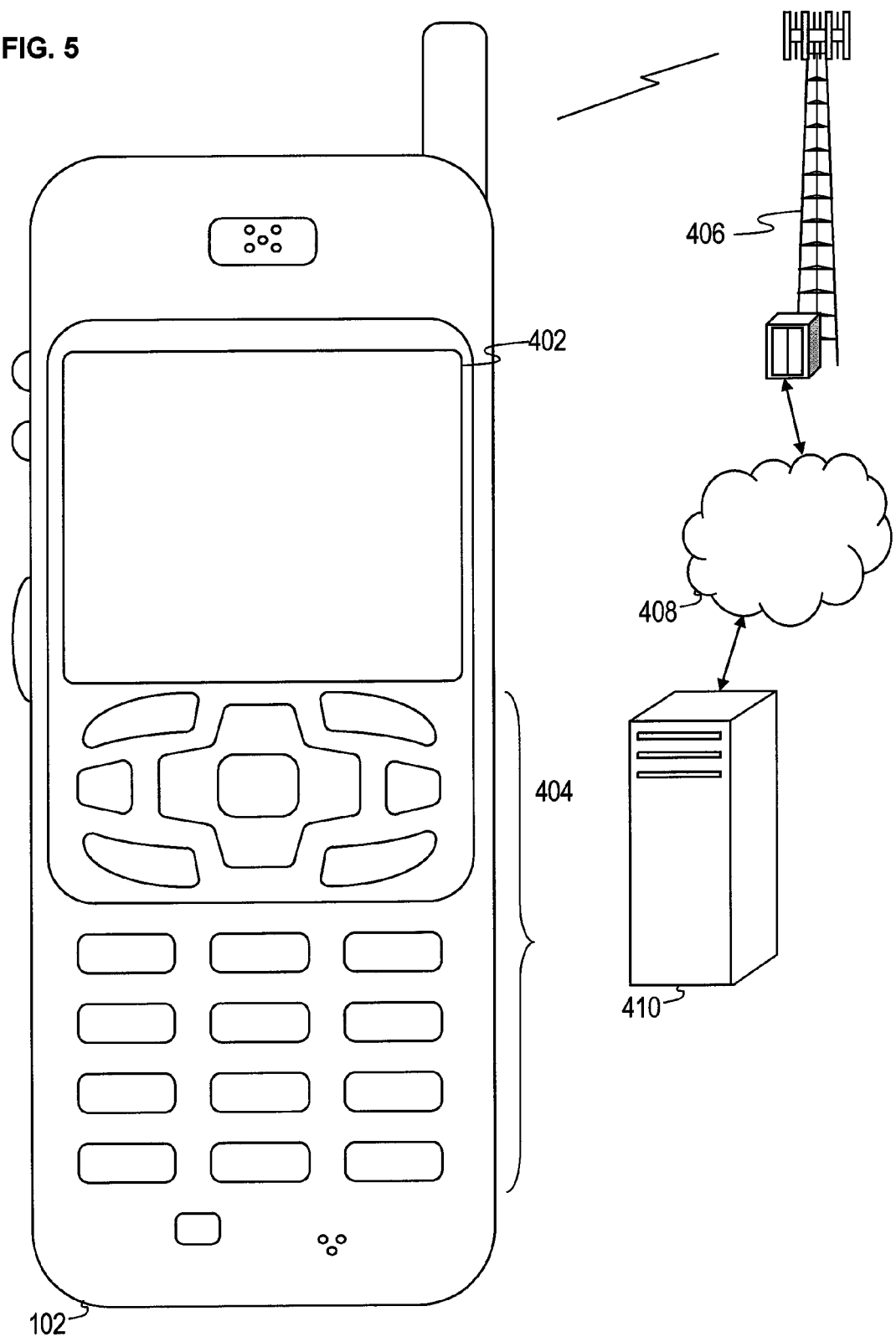
FIG. 5 is an illustration of a mobile device according to an embodiment of the disclosure.

FIG. 5 shows a wireless communications system including the handset 102. FIG. 5 depicts the handset 102, which is operable for implementing aspects of the present disclosure, but the present disclosure should not be limited to these implementations. Though illustrated as a mobile phone, the handset 102 may take various forms including a wireless handset, a pager, a personal digital assistant (PDA), a portable computer, a tablet computer, or a laptop computer. Many suitable handsets combine some or all of these functions. In some embodiments of the present disclosure, the handset 102 is not a general purpose computing device like a portable, laptop or tablet computer, but rather is a special-purpose communications device such as a mobile phone, wireless handset, pager, or PDA. The handset 102 may support specialized activities such as gaming, inventory control, job control, and/or task management functions, and so on.

The handset 102 includes a display 402 and a touch-sensitive surface or keys 404 for input by a user. The handset 102 may present options for the user to select, controls for the user to actuate, and/or cursors or other indicators for the user to direct. The handset 102 may further accept data entry from the user, including numbers to dial or various parameter values for configuring the operation of the handset 102. The handset 102 may further execute one or more software or firmware applications in response to user commands. These applications may configure the handset 102 to perform various customized functions in response to user interaction. Additionally, the handset 102 may be programmed and/or configured over-the-air, for example from a wireless base station, a wireless access point, or a peer handset 102.

The handset 102 may execute a web browser application which enables the display 402 to show a web page. The web page may be obtained via wireless communications with a cell tower 406, a wireless network access node, a peer handset 102 or any other wireless communication network or system. The cell tower 406 (or wireless network access node) is coupled to a wired network 408, such as the Internet. Via the wireless link and the wired network 408, the handset 102 has access to information on various servers, such as a server 410. The server 410 may provide content that may be shown on the display 402. Alternately, the handset 102 may access the cell tower 406 through a peer handset 102 acting as an intermediary, in a relay type or hop type of connection.

Figure 6:
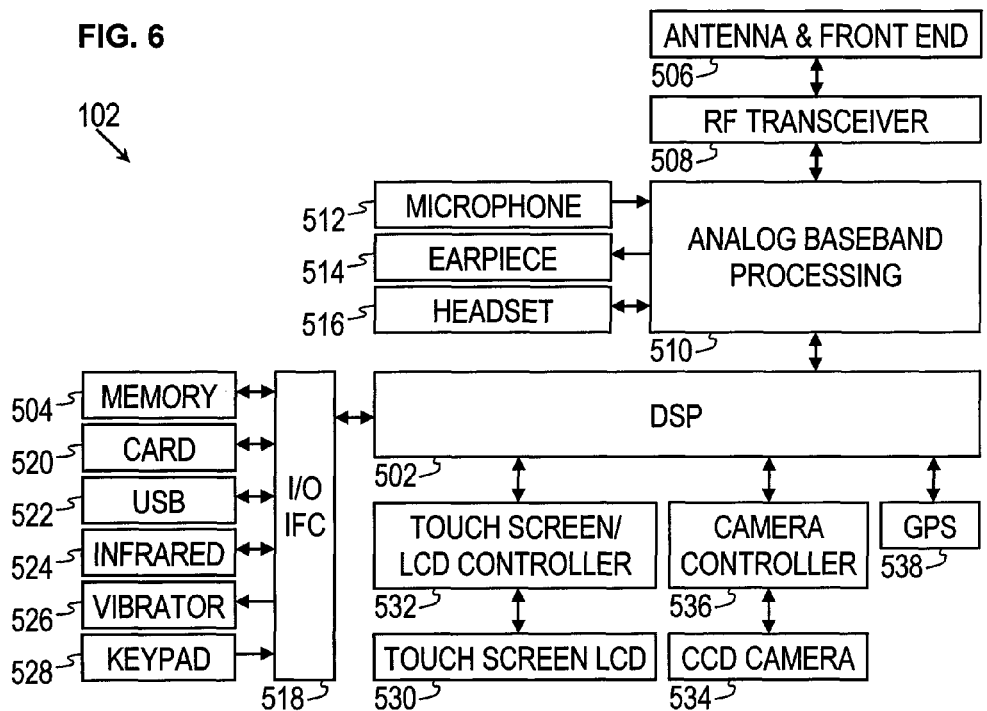
FIG. 6 is a block diagram of a mobile device according to an embodiment of the disclosure.

FIG. 6 shows a block diagram of the handset 102. While a variety of known components of handsets 102 are depicted, in an embodiment a subset of the listed components and/or additional components not listed may be included in the handset 102. The handset 102 includes a digital signal processor (DSP) 502 and a memory 504. As shown, the handset 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the handset 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the handset 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 102 to send and receive information from a cellular network or some other available wireless communications network or from a peer handset 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece speaker 514 and the headset port 516. To that end, the analog baseband processing unit 510 may have ports for connecting to the microphone 512 and the earpiece speaker 514 that enable the handset 102 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast fourier transforming, and cyclic prefix appending, and for a receiver function the DSP 502 may perform cyclic prefix removal, fast fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the handset 102 to function as a peripheral device to exchange information with a personal computer or other computer system. The infrared port 524 and other optional ports such as a Bluetooth interface or an IEEE 802.11 compliant wireless interface may enable the handset 102 to communicate wirelessly with other nearby handsets and/or wireless base stations.

The input/output interface 518 may further connect the DSP 502 to the vibrator 526 that, when triggered, causes the handset 102 to vibrate. The vibrator 526 may serve as a mechanism for silently alerting the user to any of various events such as an incoming call, a new text message, and an appointment reminder.

The keypad 528 couples to the DSP 502 via the input/output interface 518 to provide one mechanism for the user to make selections, enter information, and otherwise provide input to the handset 102. Another input mechanism may be the touch screen LCD 530, which may also display text and/or graphics to the user. The touch screen/LCD controller 532 couples the DSP 502 to the touch screen LCD 530.

The CCD camera 534 enables the handset 102 to take digital pictures. The DSP 502 communicates with the CCD camera 534 via the camera controller 536. The GPS sensor 538 is coupled to the DSP 502 to decode global positioning system signals, thereby enabling the handset 102 to determine its position. In another embodiment, a camera operating according to a technology other than charge coupled device cameras may be employed. Various other peripherals may also be included to provide additional functions, e.g., radio and television reception.

Figure 7:
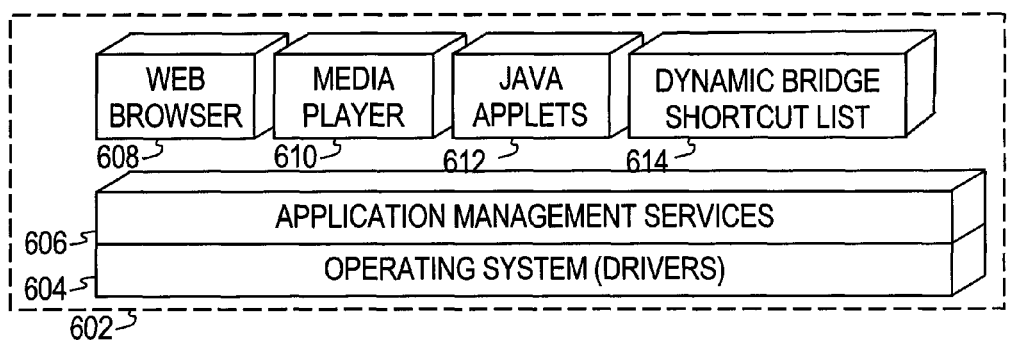
FIG. 7 is a block diagram of a software configuration for a mobile device according to an embodiment of the disclosure.

FIG. 7 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the handset 102. Also shown in FIG. 7 are a web browser application 608, a media player application 610, and JAVA applets 612. The web browser application 608 configures the handset 102 to operate as a web browser, allowing a user to enter information into forms and select links to retrieve and view web pages. The media player application 610 configures the handset 102 to retrieve and play audio or audiovisual media. The JAVA applets 612 configure the handset 102 to provide games, utilities, and other functionality. The dynamic bridge shortcut list 614 is the display of keypad shortcuts programmed into an electronic device which when activated send instructions to the gateway controller 120 to carry out certain instructions related to the dynamic bridge service.

Figure 8:
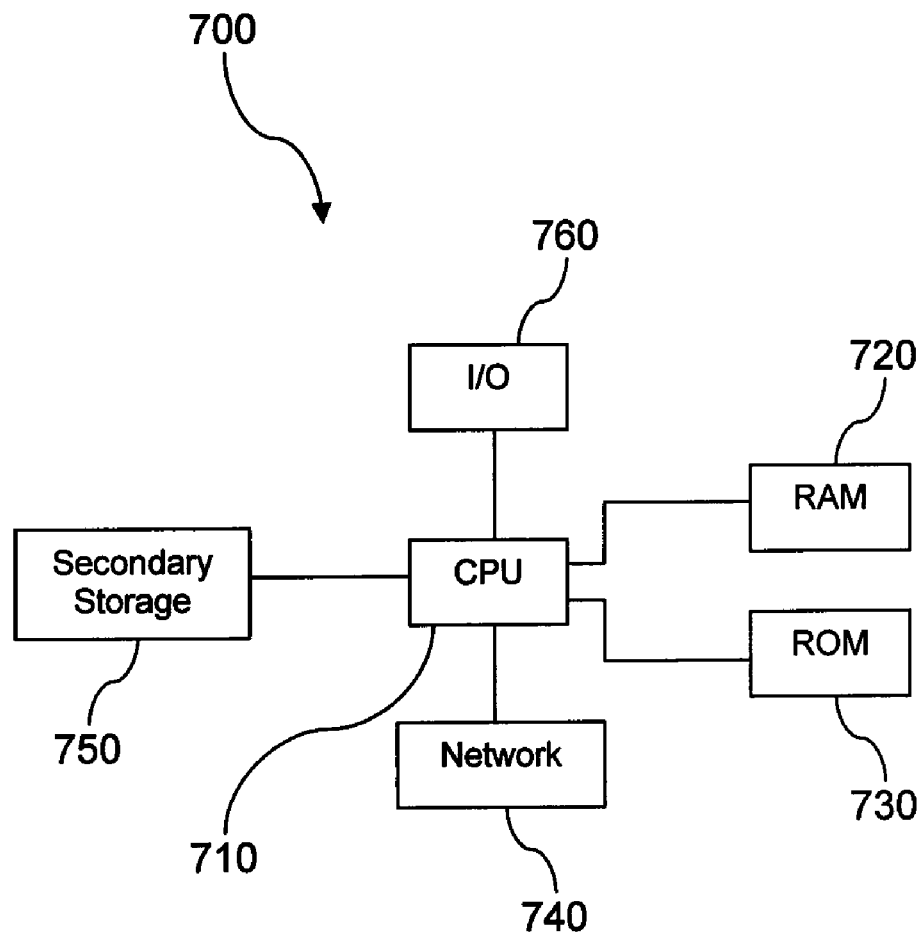
FIG. 8 illustrates an exemplary general purpose computer system suitable for implementing some aspects of the several embodiments of the disclosure.

Aspects of the system 100 described above may be implemented on any general-purpose computer with sufficient processing power, memory resources, and network throughput capability to handle the necessary workload placed upon it. FIG. 8 illustrates a typical, general-purpose computer system suitable for implementing one or more embodiments disclosed herein. The computer system 700 includes a processor 710 (which may be referred to as a central processor unit or CPU) that is in communication with memory devices including secondary storage 750, read only memory (ROM) 730, random access memory (RAM) 720, input/output (I/O) devices 760, and network connectivity devices 740. The processor 710 may be implemented as one or more CPU chips.

The secondary storage 750 is typically comprised of one or more disk drives or tape drives and is used for non-volatile storage of data and as an over-flow data storage device if RAM 720 is not large enough to hold all working data. Secondary storage 750 may be used to store programs which are loaded into RAM 720 when such programs are selected for execution. The ROM 730 is used to store instructions and perhaps data which are read during program execution. ROM 730 is a non-volatile memory device which typically has a small memory capacity relative to the larger memory capacity of secondary storage 750. The RAM 720 is used to store volatile data and perhaps to store instructions. Access to both ROM 730 and RAM 720 is typically faster than to secondary storage 750.

I/O devices 760 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 740 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 740 may enable the processor 710 to communicate with an Internet or one or more intranets. With such a network connection, it is contemplated that the processor 710 might receive information from the network, or might output information to the network in the course of performing the above-described method steps. Such information, which is often represented as a sequence of instructions to be executed using processor 710, may be received from and outputted to the network, for example, in the form of a computer data signal embodied in a carrier wave Such information, which may include data or instructions to be executed using processor 710 for example, may be received from and outputted to the network, for example, in the form of a computer data baseband signal or signal embodied in a carrier wave. The baseband signal or signal embodied in the carrier wave generated by the network connectivity devices 740 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 710 executes instructions, codes, computer programs, scripts which it accesses from hard disk, floppy disk, optical disk (these various disk based systems may all be considered secondary storage 750), ROM 730, RAM 720, or the network connectivity devices 740. While only one processor 710 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for providing a dynamic bridge service, comprising:
    provisioning a dynamic bridge service associated with at least a first private number and a second private number;
    receiving an origination attempt from an electronic device associated with a third private number to establish a call to an electronic device associated with the first private number, wherein the dynamic bridge service is not provisioned with the third private number;
    requesting a bridge configured in accordance with the provisioned dynamic bridge service to be opened in response to receiving the origination attempt;
    connecting the electronic device associated with the third private number to the bridge;
    connecting the electronic device associated with the first private number to the bridge;
    receiving a request to join the bridge from an electronic device associated with the second private number; and
    connecting the electronic device associated with the second private number to the bridge in response to receiving the request to join the bridge from the electronic device associated with the second private number.

2. The method of claim 1, wherein the first private number, the second private number, and the third private number are further characterized to be associated with electronic devices not owned by telecommunications service providers.

3. The method of claim 1, wherein each of the electronic devices is one of a mobile phone, a desktop phone, a personal digital assistant, a desktop computer, and a portable computer.

4. The method of claim 1, wherein the request to join the bridge from the electronic device associated with the second private number includes a code that is provisioned for the dynamic bridge service associated with the at least the first private number and the second private number.

5. The method of claim 1, further including closing the bridge when all the electronic devices connected to the bridge have disconnected from the bridge.

6. The method of claim 1, wherein provisioning the dynamic bridge is contracted by a subscriber for time intervals of one of about one month at a time, about one year at a time, and about two years at a time.

7. The method of claim 1, wherein the dynamic bridge service is further associated with a fourth private number, and further including:
receiving a request to join the bridge from an electronic device associated with the fourth private number; and
connecting the electronic device associated with the fourth private number to the bridge in response to receiving the request to join the bridge from the electronic device associated with the fourth private number.

8. A telecommunications bridge system, comprising:
a gateway controller programmed to determine when a call origination attempt is associated with a first private number, wherein the first private number is provisioned with a dynamic bridge service, to open a bridge configured in accordance with the provisioned dynamic bridge service in response to the call origination attempt, to cause the electronic device associated with the first private number to be connected to the bridge, to cause an electronic device associated with a second private number to be connected to the bridge, wherein the second private number is also associated with the call origination attempt, but not provisioned with the dynamic bridge service, to determine when a request from an electronic device associated with a third private number is provisioned with the dynamic bridge service provisioned for the first private number, and to connect the electronic device associated with the third private number to the bridge in response to determining that the third private number is provisioned with the dynamic bridge service provisioned for the first private number.

9. The system of claim 8, wherein the first and second private numbers are associated with the call origination attempt by one of the electronic device associated with the first private number attempting to originate a call to the electronic device associated with the second private number and the electronic device associated with the second private number attempting to originate a call to the electronic device associated with the first private number.

10. The system of claim 8, wherein the gateway controller is further programmed to determine that the first private number and the third private number are provisioned with the dynamic bridge service by accessing at least one of a home location register database and a home subscriber server database.

11. The system of claim 8, wherein the gateway controller is further provisioned to promote the phone associated with the third private number connecting to the bridge unannounced to either the phone associated with the first private number or the phone associated with the second private number.

12. The system of claim 8, wherein the request from the phone associated with the third private number and the connection of the phone associated with the third private number to the bridge requires no intervention of the users of the electronic devices associated with the first and second private numbers.

13. The system of claim 8, wherein first private number is any of a plurality of private numbers associated with a single service account and all of the plurality of private numbers associated with the single service account are provisioned with the dynamic bridge service.

14. The system of claim 13, wherein the third private number is one of the plurality of private numbers associated with the single service account.

15. The system of claim 13, wherein the third private number is not one of the plurality of private numbers associated with the single service account and is provisioned in the dynamic bridge service to have permission to connect to the bridge.

16. A method for providing a dynamic bridge service, comprising:
provisioning a dynamic bridge service associated with at least a first private number and a second private number;
receiving an origination attempt from an electronic device associated with the first private number to establish a call to an electronic device associated with a third private number, wherein the third private number is not associated with the provisioned dynamic bridge service;
requesting a bridge configured in accordance with the provisioned dynamic bridge service to be opened in response to receiving the origination attempt;
connecting the electronic device associated with the first private number to the bridge;
connecting the electronic device associated with the third private number to the bridge;
receiving a request to join the bridge from an electronic device associated with the second private number; and
connecting the electronic device associated with the second private number to the bridge in response to receiving the request to join the bridge from the electronic device associated with the second private number.

17. The method of claim 16, wherein the request is created by the electronic device associated with the second private number in response to receiving an actuation of a bridge bookmark selection, wherein the bridge bookmark selection is associated with the bridge.

18. The method of claim 16, wherein the electronic device associated with the second private number belongs to a parent monitoring a child, and wherein one of the electronic device associated with the first private number and the third private number belongs to the child.

19. The method of claim 16, further including closing the bridge when all the electronic devices connected to the bridge disconnect from the bridge.

20. The method of claim 19, wherein the provisioning occurs once and the opening and closing of the bridge occurs at least three times.

* * * * *